US007728245B2

(12) United States Patent
Redford et al.

(10) Patent No.: US 7,728,245 B2
(45) Date of Patent: Jun. 1, 2010

(54) MULTI-MACHINE MAIL SORTING SYSTEM

(75) Inventors: Dale E. Redford, Grand Prairie, TX (US); Michael O. Norris, Colleyville, TX (US); Floyd W. Worth, Richardson, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 976 days.

(21) Appl. No.: 10/842,252

(22) Filed: May 10, 2004

(65) Prior Publication Data

US 2005/0247606 A1 Nov. 10, 2005

(51) Int. Cl.
*G06K 9/00* (2006.01)

(52) U.S. Cl. ....................................... 209/584; 209/900

(58) Field of Classification Search ................. 209/584, 209/900; 382/101-102; 700/219-225
See application file for complete search history.

(56) References Cited

U.S. PATENT DOCUMENTS

| | | | | |
|---|---|---|---|---|
| 5,109,987 | A * | 5/1992 | Daboub et al. | 209/657 |
| 5,119,954 | A * | 6/1992 | Svyatsky et al. | 209/584 |
| 5,422,821 | A * | 6/1995 | Allen et al. | 700/219 |
| 6,365,862 | B1 * | 4/2002 | Miller et al. | 209/584 |
| 6,401,936 | B1 * | 6/2002 | Isaacs et al. | 209/656 |
| 6,671,577 | B2 | 12/2003 | Barnum et al. | 700/223 |
| 7,060,926 | B2 * | 6/2006 | Edmonds | 209/584 |
| 7,414,218 | B2 * | 8/2008 | Wheeler et al. | 209/584 |
| 2003/0038065 | A1 * | 2/2003 | Pippin et al. | 209/584 |
| 2003/0145664 | A1 * | 8/2003 | Schwarz et al. | 73/863.22 |
| 2003/0208298 | A1 | 11/2003 | Edmonds | 700/224 |
| 2004/0200761 | A1 * | 10/2004 | Hanson et al. | 209/584 |
| 2004/0211709 | A1 * | 10/2004 | Hanson et al. | 209/584 |
| 2005/0252836 | A1 * | 11/2005 | Burns et al. | 209/609 |
| 2006/0037888 | A1 * | 2/2006 | Wheeler et al. | 209/12.1 |

OTHER PUBLICATIONS

Direct Mag "USPS Testing New Mail-Sorting Machine" Direct Magazine Jan. 26, 1999 www.directmag.com/news/marketing_usps_testing_new/index.html.*

PR Newswire "Siemens Dematic Is Awarded USPS Contract for OCR Enhancements for Letter Mail Automation" PR Newswire Feb. 24, 2004 http://proquest.umi.com/pqdweb?index=0&did=549165431&SrchMode=1&sid=5&Fmt=3&VInst=PROD&VType=PQD&RQT=309&VName=PQD&TS=1179935598&clientId=19649.*

* cited by examiner

*Primary Examiner*—John W Hayes
*Assistant Examiner*—Tonya Joseph

(57) ABSTRACT

A sorting system using multiple sorters operating as part of a single, multi-sorting machine unified system. The system according to the invention includes a plurality of input sections capable of operating in parallel, each including a feeder that takes in mail pieces one at a time and a scanner that scans each mail piece for destination indicia, a plurality of stackers each comprising at least one row of pockets, a control system that determines a destination pocket in the stacker for each mail piece based on a predetermined sort scheme and the destination indicia, and a routing system effective to route mail in accordance with the sort scheme from any input section to any pocket of a stacker.

9 Claims, 5 Drawing Sheets

MULTI-MACHINE MAIL SORTING SYSTEM

FIELD OF THE INVENTION

The invention relates to mail sorting machines and processes of the type currently carried out by the U.S. Postal Service (USPS).

BACKGROUND OF THE INVENTION

Barnum et al. U.S. Pat. No. 6,671,577, Dec. 30, 2003, describes a system and method for directly connecting an ISS advanced facer canceler system (IAFCS) to a DBCS/OSS. As noted in that patent, the contents of which are incorporated by reference herein, conventional mail systems now in use by the USPS process stamped mail through a plurality of separate machines, including an advanced facer canceler system/input subsystem (IAFCS), an optical character reader (OCR) machine, and a delivery bar code sorter/output subsystem (DBCS/OSS). IAFCS places incoming mail into a single file line in a pinch belt, checks for appropriate postage on mail, cancels the postage, and stacks the mail in bins. IAFCS positions the mail upright between a pair of pinch belts with either the stamp leading and the address on the front side or the stamp trailing and the address on the back side. IAFCS obtains a picture image of the stamped side of each piece of mail and prints a mail identifier (ID tag) on each mail piece on the side opposite the stamped side that is stored along with the image. The image is used to determine mail type such as printed address and script address. After canceling the postage, IAFCS sorts the mail into bins based on mail type. Each mail type has two bins, one for mail with the stamp leading and one for mail with the stamp trailing The machines that next process the mail, such as DBCS/OSS, require that all the mail be positioned with the stamp leading. An operator takes the stamp trailing mail from a bin of the IAFCS and places it in a stamp leading position to combine with the stamp leading mail before feeding into the DBCS/OSS. Based on the mail type, the operator then moves the mail to the next processing point. Mail that has been imprinted by the IAFCS with a UV bar code, ID tag, is taken directly to the DBCS/OSS. DBCS/OSS prints a bar code onto the mail by querying the IPSS system for the result of computer OCR or operator video coding associated with the ID tag of the mail. DBCS/OSS sorts the mail into a plurality of stackers based on the bar code data which reflects the mail destination.

A processing method according to the '577 patent processes mail through a postage verifier having an optical character reader, mail interface system, and a mail sorter. The mail interface system includes an upward module carrying mail up to an overhead transport positioned at a height above an output of the postage verifier, and a downward module carrying mail down from the overhead transport to the mail sorter. The method includes verifying and canceling postage, positioning mail pieces in a same configuration in a single file line, directing mail pieces up the upward module, directing mail pieces through the overhead transport, directing mail pieces down the downward module to a mail sorter, and sorting the mail based on destination. The interface module referred to directly connects the IAFCS machine to the DBCS/OSS sorter, eliminating the need for manual transfer of mail between these machines.

Difficulties remain notwithstanding the potential improvement such a Direct Connect between the IAFCS machine and the sorter could provide. One such problem arises in connection with FIM (facing identification mark) mail. Facing identification marks are ⅝ inch tall vertical bars beginning at the top of the envelope near the stamp. There are 4 types of FIM:

FIM A: Courtesy reply and metered reply, Postnet bar code required

FIM B: Business reply mail, Postnet bar code not required

FIM C: Business reply mail, Postnet bar code required

FIM D: Non fluorescent IBI and PC postage, Postnet bar code not required

The most common usage is for "remittance" mail, FIM A and C that consists of bills being paid by customers of a utility company, for example.

Currently, FIM A and C are detected on the IAFCS and sorted out for special handling to reserved bins on the IAFCS. FIM A and C mail from multiple AFCS machines within a processing and distribution center, P&DC, is collected and funneled to a single DBCS machine for sorting due to the time critical nature of remittance mail. If Direct Connect is implemented and the FIM mail is passed on to the DBCS/OSS and not intercepted at the IAFCS, an additional processing step is added with respect to the existing method and a corresponding undesirable delay in processing of the FIM mail is incurred. If the FIM is pulled out at the IAFCS, this causes a loss of as much as 25% of the mail from the IAFCS machines. If the Direct Connect of the '577 patent is implemented under these circumstances, the DBCS/OSS sorting machine linked to the IAFCS machine becomes "starved", that is, does not receive enough mail from the IAFCS machine to operate efficiently The present invention addresses this problem and opens up new sorting possibilities by providing a sorting machine that is in effect several sorting machines with the capability of passing mail to be sorted between them automatically. Consolidation of inputs from multiple front ends eliminates the need for secondary sorting operations to alleviate partial trays of mail.

Edmonds U.S. Patent Publication 20030208298, Nov. 6, 2003, describes a method and system for single pass letter and flat processing. As part of the process, the '298 publication notes that use of two interconnected OCR sorting machines expands the capacity of such machines over the two machines used separately. However, this publication provides no specific guidance as to how such capability should be implemented.

SUMMARY OF THE INVENTION

The present invention provides a sorting system using multiple sorters operating as part of a single, multi-sorting machine unified system or "supercell". A sorting system according to the invention includes a plurality of input sections capable of operating in parallel, each including a feeder that takes in mail pieces one at a time and a scanner that scans each mail piece for destination indicia, a plurality of stackers each comprising at least one row of pockets, a control system that determines a destination pocket in the stacker for each mail piece based on a predetermined sort scheme and the destination indicia, and a routing system effective to route mail in accordance with the sort scheme from any input section to any pocket of a stacker. For purposes of the invention, "destination indicia" refers to an ID tag which is associated with stored address information, a bar code which gives the information, or a written address read using OCR.

BRIEF DESCRIPTION OF THE DRAWINGS

In the accompanying drawings, where like numerals denote like elements and letters (A, B, C, etc.) denote multiples of a component.

DETAILED DESCRIPTION

Figure 1:
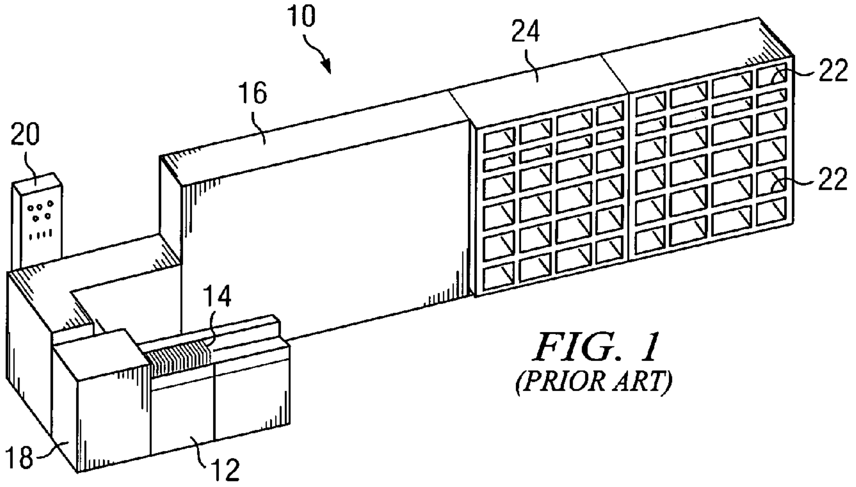
FIG. 1 (PRIOR ART)
FIG. 1 is a perspective view of a known mail sorting machine.

In a typical postal sorting machine as shown in FIG. 1, the machine 10 includes a feeder/singulator 12 where an unordered stack 14 of mail pieces are loaded for sorting. Feeder 12 singulates and transfers or conveys the mail pieces to a scanner 18 such as a bar code scanner or an optical character recognition (OCR) apparatus. Scanner 18 reads destination information from the mail pieces and transmits the information to a control computer 20 which stores the destination information and identifies the bin 22 where the mail piece is to be directed. One or more conveyors 16 convey the mail pieces to a plurality of diverters in a stacker section 24 which contains bins 22. This type of sorting machine is well known in the art and comes in a variety of types, such as Delivery Bar Code Sorter (DBCS) and DIOSS. A DIOSS machine is a Delivery bar code sorter (DBCS) with an optical character reader Input/Output SubSystem (IOSS). The present invention involves physically separating the stacker 24 of each sorter from its upstream components, referred to herein as an input section that includes at least feeder 12 and scanner 18.

The present invention exploits an aspect of the existing multi-level stacker designs in that any single level is capable of sorting mail at a rate equal to the feed rate of the front end. Thus, a stacker line with four stacker levels is theoretically capable of sorting mail at four times the rate of the feeder of an OSS or DIOSS front-end with randomly distributed mail. Statistically, a four times advantage is not achievable due to normal distributions, but a two times advantage is.

Figure 2:
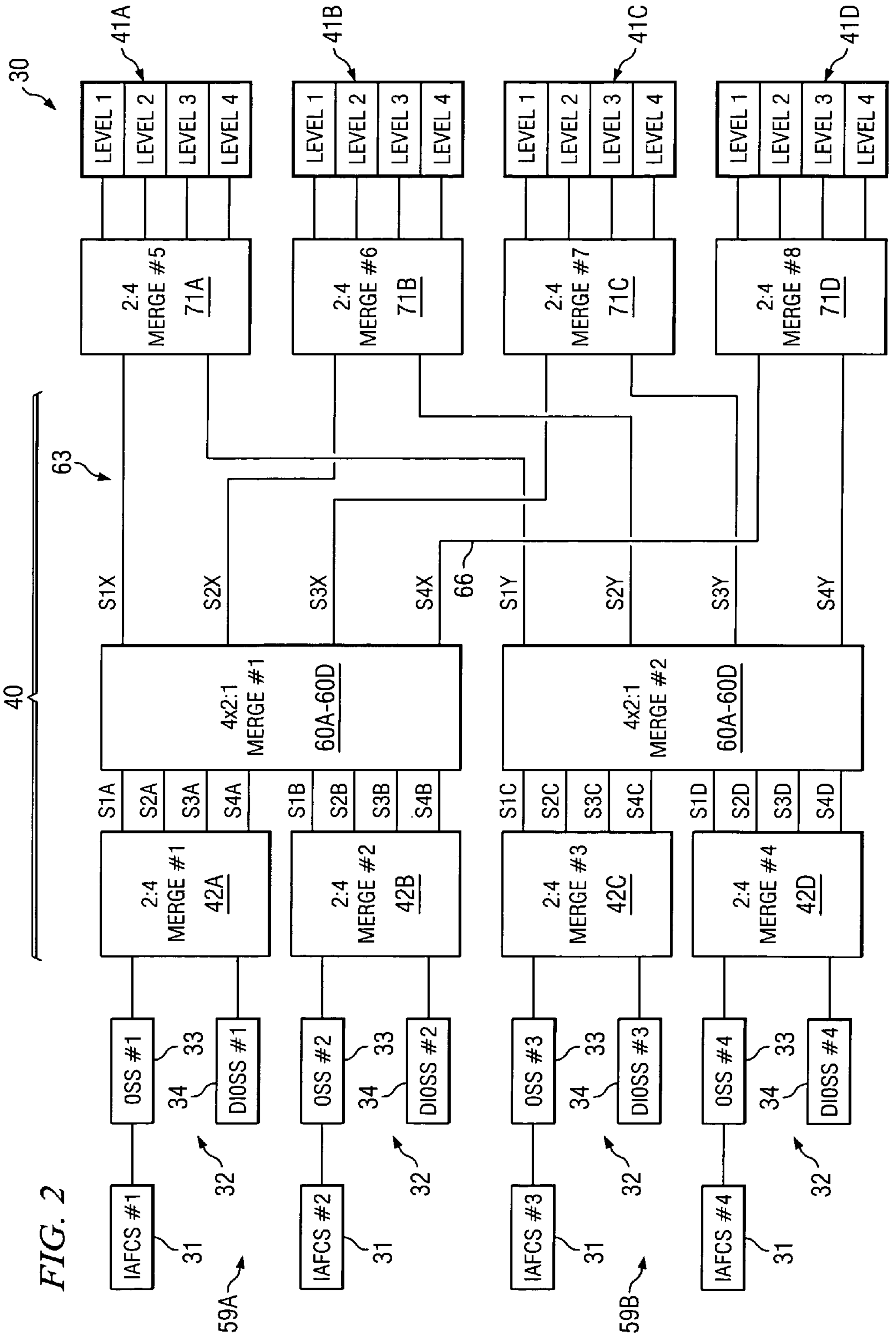
FIG. 2 is a schematic diagram of a mail sorting machine according to the invention.
Figure 3:
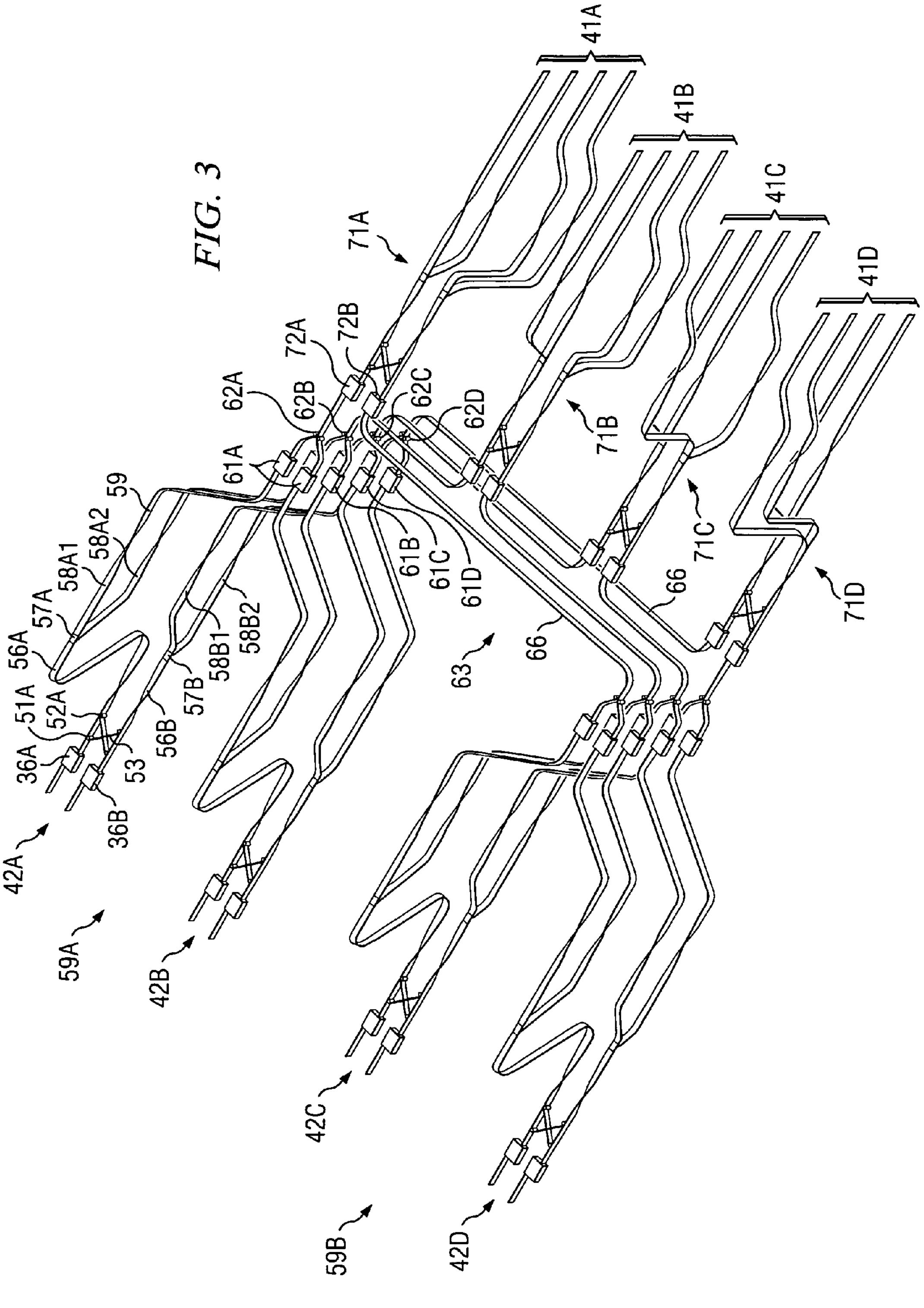
FIG. 3 is a three-dimensional representation of the machine of FIG. 2.
Figure 4:
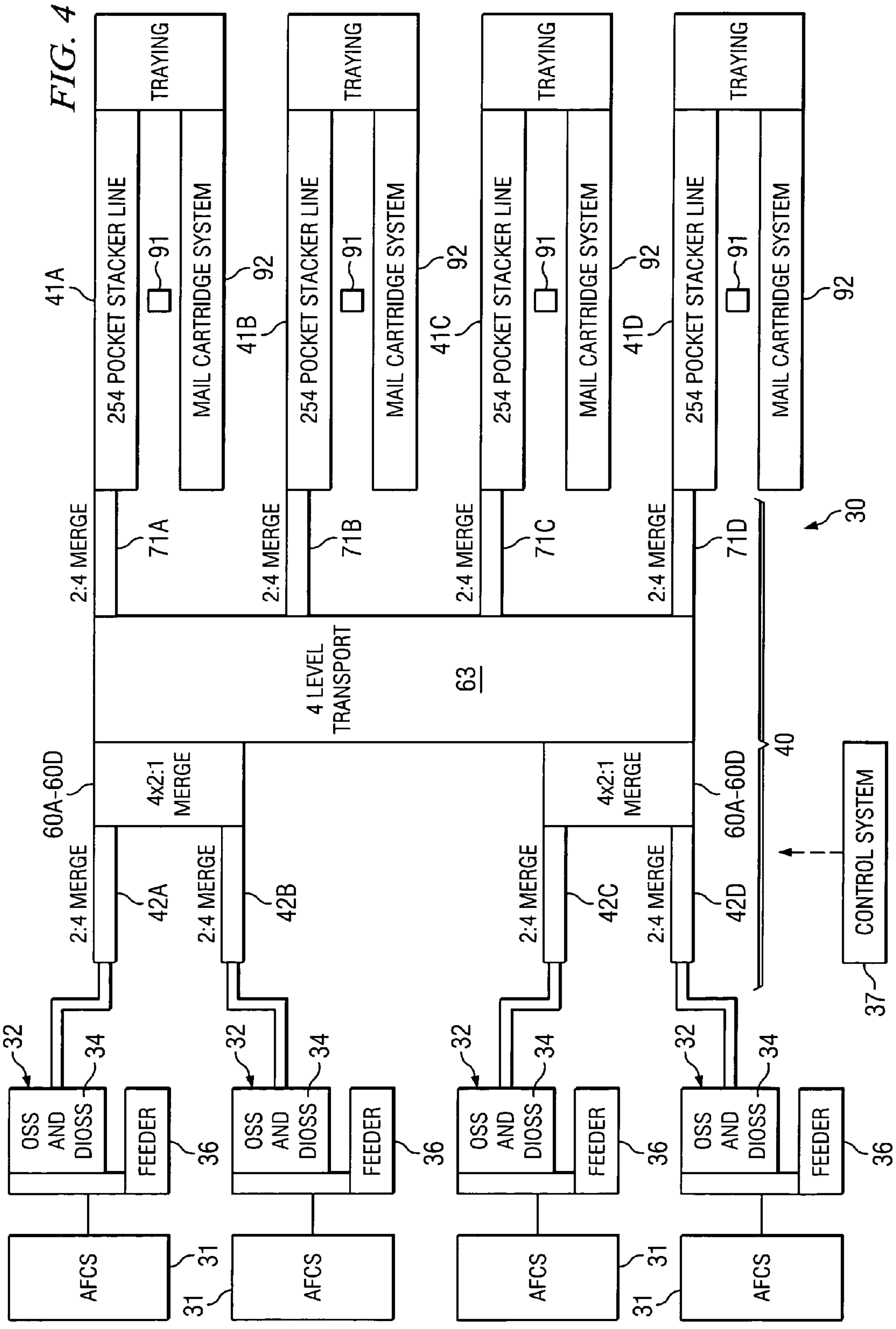
FIG. 4 is a plan view of the machine of FIG. 2.

Referring to FIGS. 2, 3 and 4, a mail sorting system 30 according to the invention receives mail from several (e.g. 2 to 4) IAFCS machines 31 that operate in parallel on incoming collection mail. Each IAFCS 31 is an Integrated Automated Facer-canceler System of a type now in use by the U.S. Postal Service that culls, faces, cancels, prints an ID tag and lifts a video image of the mail. Output from these machines 31 is transported to an associated input section 32. Each input section 32 preferably includes both an OSS 33 and a DIOSS 34 which operate at the same time. OSS 33 receives canceled mail from IAFCS 31 either by means of a direct conveyor connection as described in Barnum et al. U.S. Pat. No. 6,671,577, Dec. 30, 2003, the contents of which are incorporated by reference herein, or by manual loading of an associated feeder. OSS 33 reads an ID tag put on by IAFCS 31 and sprays the corresponding Postnet bar code onto each mail piece, which is then sorted according to the sort scheme as explained further below. DIOSS 34 receives mail that does not require cancellation, primarily metered and permit mail, through its feeder 36. DIOSS 34 prints an ID tag on each mail piece and, if resolved by the online encoding system, prints a Postnet bar code on the mail piece. The destination for each mail piece leaving each input section 32 is provided to a computerized control system 37.

Mail from either source exits input section 32 and enters a routing section 40 that is interposed between input sections 32 and a series of stackers 41. The specific design of routing section 40 will vary to some extent depending on the number of input sections and stackers associated with it. In this example, eight input machines 33, 34 are linked to four 254 pocket stacker lines each having four rows of pockets at different elevations, but the number of components on each side of routing section 40 does not necessarily have to be 2:1 as discussed further below. Control system 37 operates the diverts of routing section 40 in a manner effective to direct each mail piece to any one of the stackers 41, depending on the sort scheme.

While a variety of vertical and horizontal conveyor systems are known in the art, to create routing system 40 successfully, certain principles should be observed. First, the average volume of mail on any one section of transport cannot exceed the average output of one DIOSS or OSS input, assuming a random distribution at input. This may require adjustment of the pinch belt transport speeds, for example, using a faster belt speed at the takeaway portion of a merge. Second, mail held in pinch belts vertical to the earth may be turned or diverted along a horizontal plane, whereas this is difficult to do with mail held horizontally. Third, mail held in pinch belts horizontal to the earth may be turned or diverted in a vertical direction, i.e. can readily change elevation. The following description of routing section 40 illustrates these principles.

Figure 5:
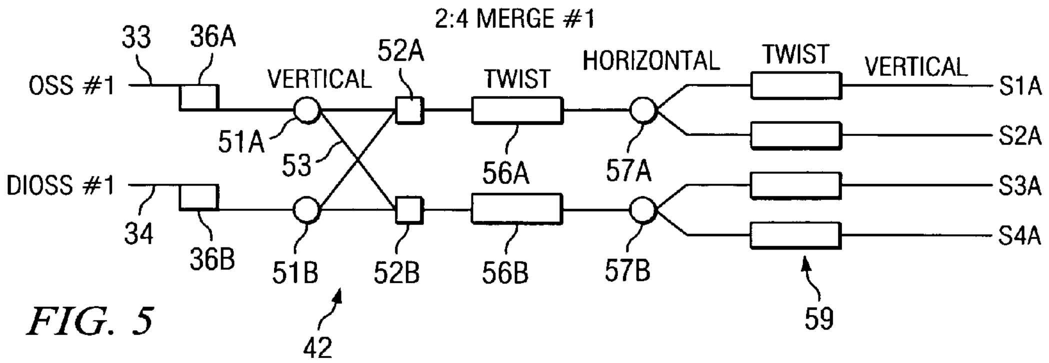
FIG. 5 is a schematic diagram of a (2:4) merge used in the invention.

Mail entering routing section 40 from one of the input sections 32 first enters a 2 to 4 (2:4) merge section 42. FIG. 5 illustrates one of the (2:4) merges 42. Mail from a first OSS 33 travels along a vertical pinch belt conveyor to a first vertical divert 51A where it is routed either straight ahead to a first merge 52A or diverted to a second merge 52B, depending on the ultimate destination. A vertical divert for purposes of the invention is one that diverts the mail while it is in a vertical position, and a horizontal divert is one which diverts the mail while the mail is in a horizontal position.

Mail from a first DIOSS 34 travels along a vertical belt conveyor to a divert 51B where it is routed either straight ahead to second merge 52B or diverted to first merge 52A, again depending on the ultimate destination. For this purpose, although it could be avoided by designing OSS 33 and DIOSS 34 pairs at different elevations, the mail pieces pass through an intersection 53 where the conveyor paths pass through one another. For this purpose, (2:4) merges 42 are preferably each provided with input buffers 36A, 36B, which may for example be a feeder capable of holding 1 to 3 mail pieces in a vertical stack, taking them in on an input side and ejecting them on a output side after a short delay in first-in, first-out order. Buffers 36A, 36B are controlled as described hereafter to ensure that collisions between mail pieces passing through intersection 53 are avoided and each mail piece is diverted to its correct destination. Diverts 51 and merges 52 may be of types known in the mail sorting art. Shifting wedge-type diverts 51 may be used.

Mail conveyed from each merge 52A, 52B enters a pair of twist sections 56A, 56B wherein the belt path changes from vertical to horizontal as illustrated in the three-dimensional FIG. 3. Twist sections as described herein are pinch (dual) belt conveyors wherein the orientation of the belts gradually changes due to the layout of the supporting rollers as the belts move along. Once horizontal, the mail stream from merge 52A is taken to a different (in this case, higher) elevation than the mail stream from merge 52B. A pair of horizontal diverts 57A, 57B then further divide the mail streams from twist sections 56A, 56B into four mail streams carried by horizontal pinch belt conveyors 58A1, 58A2, 58B1 and 58B2, each at a different elevation. Conveyors 58A1, A2, B1, B2 then each enter a second twist section 59 wherein each conveyor assumes a vertical orientation.

Figure 6:
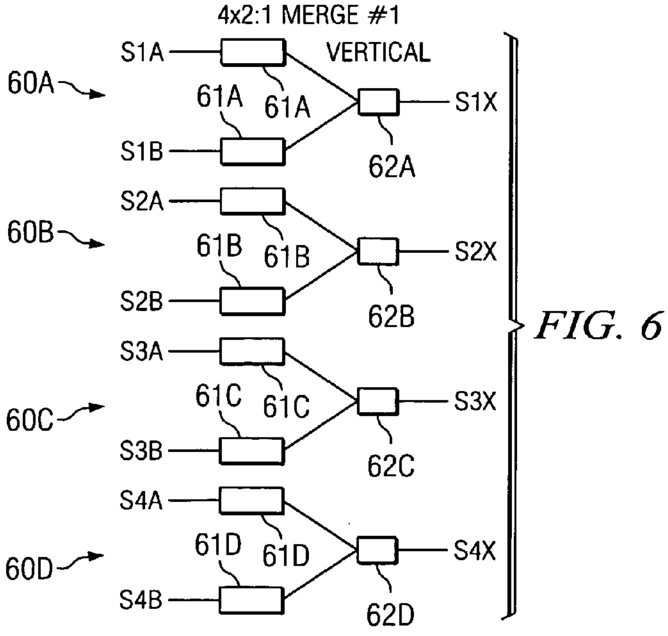
FIG. 6 is a schematic diagram of four (2:1) merges used in the invention.

In the embodiment shown, the inputs for the entire system 30 are divided into two sections 59A, 59B each receiving input from 2 OSS and 2 DIOSS machines. Sections 59A, 59B each have two 2:4 merges 42A, 42B and 42C, 42D which are essentially identical as shown in FIGS. 2-4. The mail streams from left and right merges 42A, 42B and 42C, 42D must next be merged such that all mail from any one of the OSS or DIOSS machines in that section 59A or 59B intended for a specific sorter 41A-D is brought together. Four (2:1) vertical merges 60A-60D per section are provided for this purpose as shown in FIGS. 4 and 6.

Each (2:1) merge section 60A-60D receives one mail stream from section 42A and a matching mail stream merge 42B destined for the same stacker 41. For this purpose, each merge 60 includes a pair of buffers 61A-61D which feed mail pieces to path merges 62A-62D, respectively. The conveyors leading away from path merges 62 then comprise a 4-level vertical transport section 63 of the routing system. In transport section 63, mail pieces from each section 59A, 59B destined for the same stacker 41 are brought together at four (2:4) merges 71A-D. This requires, in the case of mail pieces needing to cross the system from one side to the other, relatively long lateral conveyor spans 66 that are spaced apart vertically as shown in FIG. 3. For this purpose, "crossing the system" means, for example, a mail piece entering from leftmost input section 32 that must be routed to rightmost stacker 41.

Merges 71A-D may be functionally the same as merges (2:4) merges 42 shown in FIG. 5, but with differences in the layout of the conveyor pathways as shown in FIG. 3. The output from merges 71A-D is at four different elevations corresponding to each level of the associated stacker 41A-41D. Preferably, each (2:4) merge 71A-71D has associated buffers 72A, 72B capable of holding from 1 to 3 mail pieces at a time. Buffers 72 are operated by control system 37 to ensure that jams do not occur at (2:4) merges 71A-71D.

Mail entering one of stackers 41A-D enters at one of the four levels and is sorted to the pocket assigned by the sort scheme. The system of the invention is intended for use at postal P&DC's for sorting according to high level sort schemes, e.g. by 3 or 5 digit zip codes. However, with a larger number of pockets available, more refined sort schemes become possible wherein fewer sorts to the 3-digit level need to be made. As such, mail sorted using the system of the invention is well suited for use with a single pass sorting system that sorts to carrier sequence order, such as the one disclosed in Pippin et al. U.S. Patent Application 20030038065, published Feb. 27, 2003, the contents of which are incorporated by reference herein.

FIM mail from all eight input machines is preferably funneled to one stacker or stacker row(s), where some of the pockets are assigned to specific high volume FIM recipients, some national and some local. As a result, FIM mail is handled in a manner which causes no delay in operations and does not "starve" a sorter directly connected to an IAFCS machine, as may happen in the system described Barnum et al. U.S. Pat. No. 6,671,577.

Stackers 41 may be of the conventional type which must be swept manually by postal workers during and after sorting. The stacks of mail are then loaded into trays for transport at a nearby traying station. In the alternative, the stackers may use cartridges in the manner described in U.S. Pat. Nos. 6,390,756, 6,183,191, 6,135,697, 6,026,967, 5,993,132, 5,947,468, 5,857,830 and 5,833,076, the contents of which patents are incorporated by reference herein. The mail cartridges are not used for two pass sorting, but instead are removed by a robot 91 and transported to a storage rack 92 and ultimately to an unloading table or machine which unloads the mail into a postal tray. Such an unloading machine is described in Isaacs U.S. Pat. No. 6,238,164, May 29, 2001, the contents of which are incorporated by reference herein.

Figure 7:
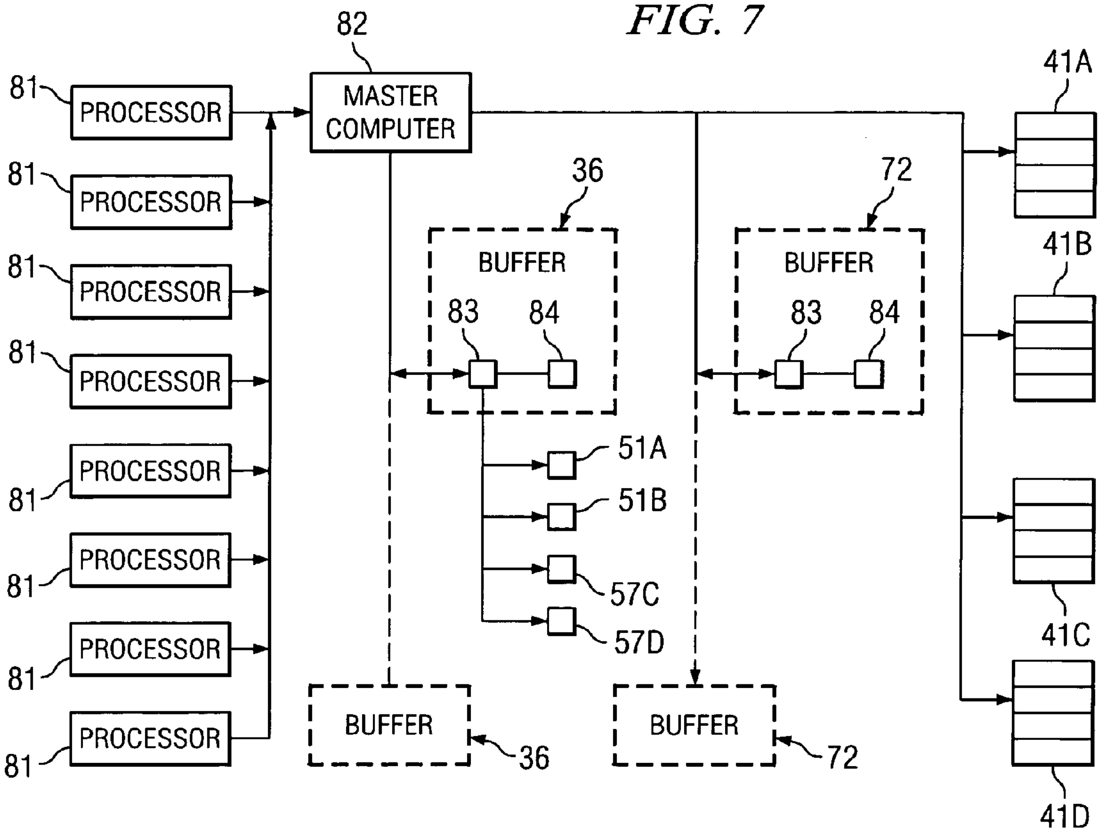
FIG. 7 is a schematic diagram of a control system for the machine of the invention as shown in FIGS. 2-6.

Control system 37 according to the invention could comprise a single computer that reads all the incoming mail pieces and determines respective sorting destinations, as well as controls all buffers, sorting gates and diverts in order to conducting each mail piece through the routing system to the correct stacker pocket. However, referring to FIG. 7, it is preferable that such a system comprise several computers, including a set of processors 81 for each OSS or DIOSS machine that are programmed to determine the sorting destination and transmit that information to a master control computer 82. In lieu of attempting to track the movements of the entire mail stream moving through the routing system at any given time, it is preferred that each mail piece be tracked by its ID tag at certain strategic locations in the system. Each IAFCS and DIOSS machine applies an ID tag, such as an ultraviolet-detectable bar code, onto all mail pieces passing through, and computer 82 maintains a table of ID numbers and associated destination pockets according to the sort scheme.

Each buffer 36, 72 has associated therewith a local controller 83 which controls the operation of the buffer and the immediately downstream diverters, 51A-B and 57C-D, that act in coordination with the buffer to ensure that each mail piece is diverted in the correct direction. Each buffer 36, 72 also has a tag reader 84 that reads the ID tag on each mail piece entering the buffer, sends the number to master computer 82, and receives back instructions on how to divert that mail piece. By this means, it does not matter in what order mail pieces arrive at each buffer 72, as long as each piece is diverted to the correct destination. A mail piece that reaches a buffer 72 in error is directed by master computer 82 to a special reject pocket on that stacker for later re-processing. Buffers 61A-61D, which are not associated with any diverts, need not have a tag reader or computerized controller beyond what is needed to avoid jams in the downstream merges 62.

In variations of the system according to the invention, the number of input feeders and stackers may be varied to some extent. For purposes of designing the routing system, it is much preferred that the number of input sorters be twice the number of stackers, and that this number be an even number, 2, 4, or 8 being most likely for practical purposes. In a system with only 2 input sorters, e.g., one OSS and one DIOSS operating in parallel, the routing system can be simplified to include only the first 2:4 merge which feeds directly to each level of a single stacker. A system twice the size of the illustrated embodiment would be possible, but the routing system would become much more complex, with sufficient diverts and merges to take a mail piece to any one of 32 levels in eight stackers. A system missing one input, i.e. 7 inputs for 8 stackers, or where one of eight inputs is out of service, could operate using the same routing system as described above or simplified for the portion of the routing system connected to the single input. For practical purposes, the preferred number of input sorters is between 6 and 8, with a corresponding number of stackers. These and other variations will occur to those skilled in the art and are within the scope of the claims presented hereafter.

The invention claimed is:

1. A sorting system for postal mail, comprising:

a plurality of input sections each including a feeder that takes in mail pieces one at a time and a scanner that scans each mail piece for destination indicia; a plurality of stackers each comprising a plurality of rows of pockets and a pinch belt system that receives mail pieces in a stream, routes them in separate streams past each row of pockets and diverts mail pieces into pockets according to a sort scheme;

a routing system including:

a first set of pinch belt conveyors for taking mail pieces away from each of the input sections in a continuously moving stream, a second set of pinch belt conveyors for taking mail pieces to each of the stackers-in a continuously moving stream, routing pinch belt conveyors connecting the first set of conveyors to the second set of conveyors whereby mail pieces fed by the input sections move simultaneously in continuously moving streams from each input section, along the first conveyors to the routing conveyors, along the routing conveyors to the second conveyors, and along the second conveyors to the stackers, diverts forming part of the routing conveyors, each divert including a sensor for detecting a mail piece entering the divert, a mechanism for selectively diverting a mail piece passing through the divert out of a mail stream moving on one pinch belt conveyor and permitting undiverted mail pieces to continue to move along the pinch belt conveyor of which the divert is part, and merges associated with each divert that receive mail pieces diverted by the divert and merge them into a mail stream on another routing pinch belt conveyor, wherein the merges and diverts are arranged on the routing conveyors so that a mail piece from any input section is conveyed, when required by the sort scheme, by any of the second conveyors to any pocket of any stacker;

a control system that determines a destination pocket in one of the stackers for each mail piece based on a predetermined sort scheme and the destination indicia read by the scanners of the input sections, the control system operating the input sections in parallel simultaneously and operating the merges and diverts using signals received from the sensors to route mail in accordance with the sort scheme from any input section to any pocket of any stacker;

wherein the merges and diverts are positioned and the control system operates the routing system to;

form a first input stream from a first input section that contains mail to be conveyed to said stackers;

form a second input stream from a second input section that contains mail to be conveyed to said stackers;

split the first input stream into multiple output streams; split the second input stream into multiple output streams; and merge together pairs of output streams, one from the first input stream and one from the second input stream, wherein the mail pieces in the merged output streams of each pair are destined for transport to the same stacker.

2. The system of claim 1, further comprising means for preventing collisions between a mail piece entering a pinch belt conveyor from a merge and other mail pieces moving on that pinch belt conveyor.

3. The system of claim 2, wherein the means for preventing collisions comprises a buffer capable of holding a mail piece and releasing the mail piece to the pinch belt conveyor it is carried on after a delay.

4. The sorting system of claim 1, wherein the stackers comprise sorting gates which divert a mail piece from the incoming stream from the second conveyors to a pocket of a stacker as determined by the control system.

5. The system of claim 1, wherein the number of input sections is twice the number of stackers.

6. The system of claim 1, the input sections consist of a number N of OSS machines and a number N of DIOSS machines, and there are a number N of stackers.

7. The system of claim 6, wherein N=4.

8. The system of claim 5, wherein the number of input sections is 6 or 8, neither less nor more.

9. A sorting system for postal mail, comprising:

at least four first, second, third and fourth input sections each including a feeder that takes in mail pieces one at a time and a scanner that scans each mail piece for destination indicia;

at least four stackers each comprising a plurality of rows of pockets and a pinch belt system that receives mail pieces in a stream, routes them in separate streams past each row of pockets and diverts mail pieces into pockets according to a sort scheme;

a routing system including;

a first set of pinch belt conveyors for taking mail pieces away from each of the input sections in a continuously moving stream;

a second set of pinch belt conveyors for taking mail pieces to each of the stackers in a continuously moving stream;

routing pinch belt conveyors connecting the first set of conveyors to the second set of conveyors whereby mail pieces fed by the input sections move simultaneously in continuously moving streams from each input section, along the first conveyors to the routing conveyors, along the routing conveyors to the second conveyors, and along the second conveyors to the stackers;

diverts forming part of the routing conveyors, each divert including a sensor for detecting a mail piece entering the divert, a mechanism for selectively diverting a mail piece passing through the divert out of a mail stream moving on one pinch belt conveyor and permitting undiverted mail pieces to continue to move along the pinch belt conveyor of which the divert is part; and merges associated with each divert that receive mail pieces diverted by the divert and merge them into a mail stream on another pinch belt conveyor, wherein the merges and diverts are arranged on the routing conveyors so that a mail piece from any input section is conveyed, when required by the sort scheme, by any of the second conveyors to any pocket of any stacker, wherein the merges, diverts and routing conveyors are positioned to:

(a) form a first input stream from the first input section which contains mail to be conveyed to said stackers, and a second input stream from the second input section contains mail to be conveyed to said stackers, (b) split the first input stream into multiple output streams;

(c) split the second input stream into multiple output streams;

(d) merge together pairs of output streams one from the first input stream and one from the second input stream, wherein the mail pieces in the streams of each such pair are destined for transport to the same stacker section;

(e) form a third input stream from the third input section which contains mail to be conveyed to said stackers, and a fourth input stream from the fourth input section contains mail to be conveyed to said stackers, (f) split the third input stream into multiple output streams;

(g) split the fourth input stream into multiple output streams;

(h) merge together pairs of output streams one from the third input stream and one from the fourth input stream, wherein the mail pieces in the streams of each such pair are destined for transport to the same stacker section;

(i) merge together pairs of output streams resulting from merges (d) and (h) wherein the mail pieces in the streams of each such pair are destined for transport to the same stacker section, wherein there are two mail streams for transport to each stacker, and each stacker has an associated merge section wherein mail pieces from the two streams are merged into stacker streams, one for each row of pockets on the stacker;

(j) repeat step (i) for all output mail streams until all mail pieces from all input sections are transported to a stacker; and a control system that determines a destination pocket in one of the stackers for each mail piece based on a predetermined sort scheme and the destination indicia read by the scanners of the input sections, the control system operating the input section in parallel simultaneously and operating the merges and diverts using signals received from the sensors to route mail in accordance with the sort scheme form any input section to any pocket of any stacker through the routing section.

* * * * *